United States Patent [19]
Whatley

[11] Patent Number: 6,009,271
[45] Date of Patent: *Dec. 28, 1999

[54] METHOD OF RETRIEVING DATA FROM A RELATIONAL DATABASE

[75] Inventor: Don Whatley, Houston, Tex.

[73] Assignee: BMC Software, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,144

[22] Filed: Oct. 28, 1996

[51] Int. Cl.⁶ .................................................. G06F 17/30
[52] U.S. Cl. ........................................... 395/705; 707/203
[58] Field of Search ........................ 707/1–10, 100–104, 707/200–206; 1/1

[56] References Cited

U.S. PATENT DOCUMENTS

| | | | |
|---|---|---|---|
| 5,222,235 | 6/1993 | Hintz et al. | 707/101 |
| 5,257,366 | 10/1993 | Adair et al. | 707/4 |
| 5,280,612 | 1/1994 | Lorie et al. | 707/8 |
| 5,317,742 | 5/1994 | Bapat | 395/680 |
| 5,367,675 | 11/1994 | Cheng et al. | 707/2 |
| 5,396,623 | 3/1995 | McCall et al. | 707/101 |
| 5,408,654 | 4/1995 | Barry | 707/101 |
| 5,430,871 | 7/1995 | Jamoussi et al. | 707/202 |
| 5,432,933 | 7/1995 | Janicek | 395/670 |
| 5,440,692 | 8/1995 | Janicek | 707/101 |
| 5,446,885 | 8/1995 | Moore et al. | 707/103 |
| 5,619,713 | 4/1997 | Baum et al. | 707/102 |
| 5,630,127 | 5/1997 | Moore et al. | 707/104 |
| 5,671,403 | 9/1997 | Shekita et al. | 707/3 |
| 5,692,174 | 11/1997 | Bireley et al. | 1/1 |
| 5,692,182 | 11/1997 | Desai et al. | 1/1 |
| 5,706,506 | 1/1998 | Jensen et al. | 1/1 |
| 5,742,810 | 4/1998 | Ng et al. | 707/4 |
| 5,875,334 | 2/1999 | Chow et al. | 395/705 |

*Primary Examiner*—Ruay Lian Ho
*Attorney, Agent, or Firm*—Tim Headley; Haynes and Boone, LLP

[57] ABSTRACT

A computerized method of retrieving data from a relational database stored in a computer memory, using SQL queries, which give rise to result sets derived from data objects in the database. The method includes the steps of capturing an SQL query and corresponding result set, and saving the SQL query and result set. In another feature of the invention, the method includes, before the step of capturing an SQL query and corresponding result set, the step of monitoring the SQL queries. In another feature of the invention, the method includes, before the step of saving the SQL result set, the steps of comparing the SQL query with prior saved SQL queries, determining if an identical prior SQL query already exists in cache, and if an identical prior SQL query does not already exists, saving the SQL query and result set. In another feature of the invention, each data object used by the saved result sets has an associated data object time stamp, and the method of the invention monitors the data object time stamps of all data objects used by the result sets.

4 Claims, 3 Drawing Sheets

| First Host Variable /150 | | | Second Host Variable /152 | | | Nth Host Variable /154 | | |
|---|---|---|---|---|---|---|---|---|
| data type | length | value of host variable | data type | length | value of host variable | | | |

| /170 | /172 | /174 | /176 |
|---|---|---|---|
| 4-byte SQL statement hash_sum | 4-byte host variable hash_sum | 2-byte integer of number of database objects in creation of result set | 2-byte integer of number of columns in result set |

METHOD OF RETRIEVING DATA FROM A RELATIONAL DATABASE

BACKGROUND OF THE INVENTION

This invention relates to retrieval of data from a relational database, and, more particularly, to a method of retrieving data using SQL queries from the DB2 database licensed by International Business Machines Corp. ("IBM"). The Structured Query Language (SQL) is a language for accessing data in a relational database. It was originally created by IBM. In the 1980's, The American National Standards Institute (ANSI) and the International Standards Organization (ISO) published SQL standards in 1986 and 1987, respectively. ANSI and ISO jointly worked on an extension to the standards, variously called SQL2, SQL-92, or SQL/92. Another extension to the standards, SQL3, is in progress, to enhance relational capabilities, and add support for object-oriented features.

According to IBM's DB2 glossary, a query to a relational database is a request for information from the database based on specific conditions. For example, a query could be a request for a list of all customers in a customer table who live in Texas.

Also according to IBM's DB2 glossary, in an application host program, embedded Structured Query Language (SQL) statements will reference host variables. Host variables are programming variables in the application program, and are the primary mechanism for transmitting data between tables in the database and application program work areas.

The prior art teaches that in order to reduce response time to SQL queries directed to a relational database, the user must improve his hardware, by buying a faster CPU or adding more space for data storage, or both, or improve his software by providing for more software storage or buffering of data objects. The prior art buffers, or caches, merely raw data. For example, for a query of average salaries, the prior art buffers, or caches, merely the salaries, not the average of those salaries, i.e., the result of the query is not cached.

More specifically, the following limitations exist with DB2: SQL result tables are not saved; the scope of a result table is the program by which it is defined; and result tables can be processed from top to bottom only once.

What is needed is a method of reducing the response time to SQL queries directed to a relational database, without having to increase the hardware requirements, and without having to provide more excessive software caches for data objects. More specifically, what is needed is a program that will eliminate the creation time for all SQL queries except the initial query by saving or caching the results of the query; that will satisfy queries from any source, batch or interactive, from the same cached result tables; that will treat SQL "select into" statements as single-row result tables, and cache them for repetitive availability; and that will save result tables for iterative and multi-source processing.

SUMMARY OF THE INVENTION

The present invention, accordingly, provides a computerized method of retrieving data from a relational database stored in a computer memory, by recalling saved SQL queries and result sets, which were saved from previously identical SQL queries. The method includes the steps of capturing an SQL query (including the associated host variables) and the result set, which is derived from data objects in the database, and saving the SQL query and result set in cache or storage. In another feature of the invention, the method includes, before the step of capturing an SQL result set, the step of monitoring the SQL queries to the database. In another feature of the invention, the method includes, before the step of saving the SQL result set, the steps of comparing the SQL query with prior saved SQL queries, determining if an identical prior SQL query and result set have been saved, and if an identical prior SQL query has not been saved, saving the SQL query and the result set. In another feature of the invention, the method includes saving only certain user-selected SQL queries and result sets. In another feature of the invention, each data object used by the saved result sets has an associated time stamp, which indicates when the data object was last updated or modified. The method of the invention monitors updates to all data objects in the database, and updates the data object time stamps of all data objects currently used by the saved result sets. After the step of saving the SQL result set, the method of the invention stores a create time stamp, the create time stamp being the time at which the step of creating the SQL result set occurred. If an identical prior SQL query and result set already exist in cache, the method of the invention compares the create time stamp of the identical prior SQL result set with the data object time stamps of all the data objects used by the SQL result set. If no data object time stamp in the SQL result set is later than the save time stamp of the identical prior SQL result set, then the method of the invention recalls the identical prior SQL result set. If any data object time stamp in the SQL result set is later than the create time stamp of the identical prior SQL result set, then the method first deletes the prior SQL result set, and then saves the newly created result set.

DETAILED DESCRIPTION OF THE PREFERRED EMBODIMENT

Figure 1:
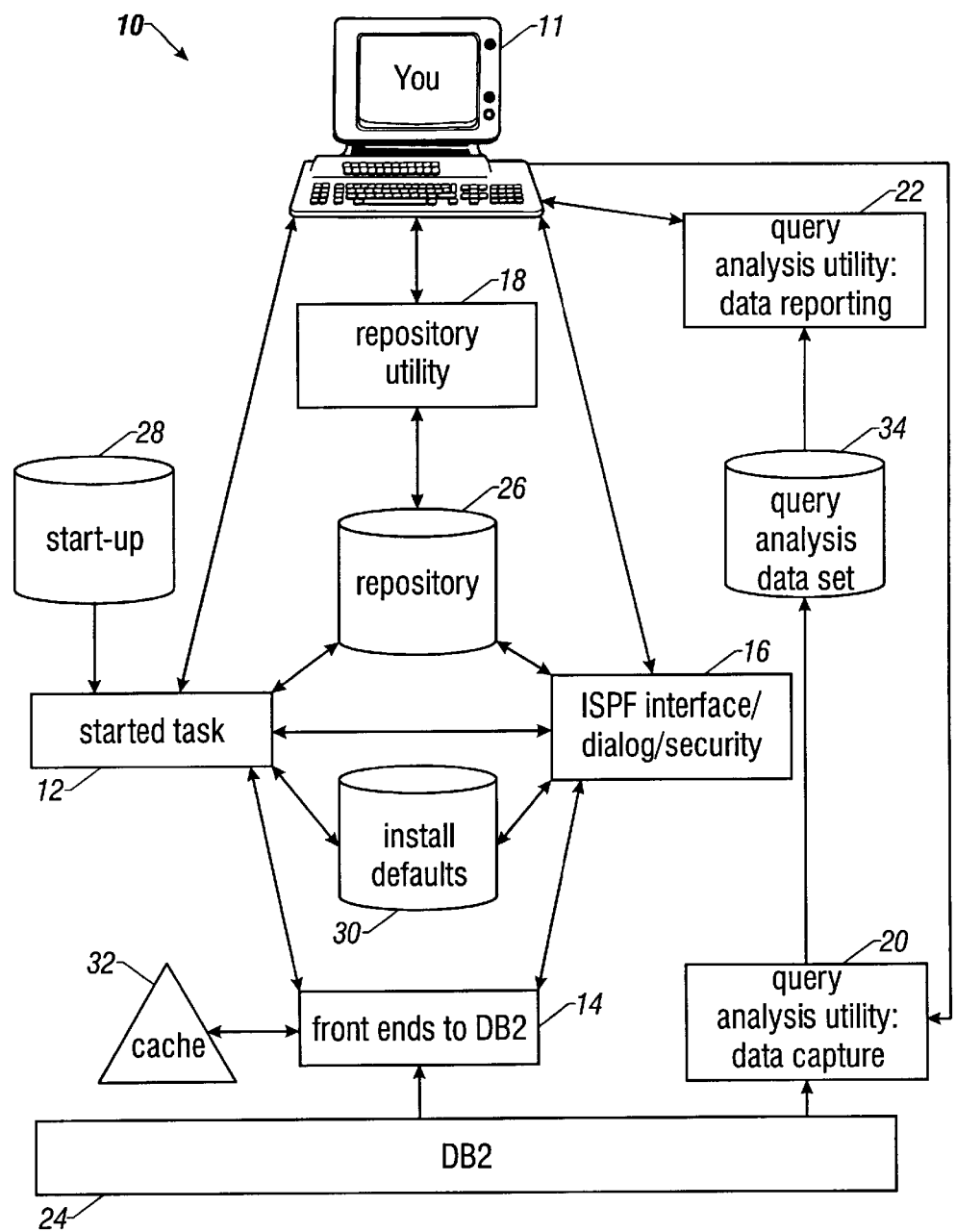
FIG. 1 is a block diagram showing the relationship between the program of the present invention and DB2.

The method of the present invention is used with the DB2 Version 2.3 or later relational database, but it could be used with any relational database. The program of the preferred embodiment (called "SQL Recall") is a method of retrieving data from a relational database, using SQL queries. In the preferred embodiment, SQL Recall executes on an IBM MVS computer system, not shown in the figures, which is running DB2, and which keeps the most frequent SQL queries to DB2 in memory. The answers to the SQL queries are result sets, which are derived from data objects in DB2. Referring to FIG. 1, the user interfaces with an SQL Recall program 10 via a terminal 11. The SQL Recall program 10 has the following components: a started task 12, front ends 14 to DB2 24, an ISPF interface/dialog 16, a repository utility 18, a query analysis utility 20 for data capture, and a query analysis utility 22 for data reporting. ISPF is Version 3.3 or later, and is an IBM interactive interface program.

The SQL Recall program runs as a started task 12 under MVS, the IBM operating system of an IBM mainframe computer. The operating system must be MVS/ESA Version 5.1 or later (when caching for data sharing groups), or MVS/ESA Version 3.1.3 or later (when not caching for data sharing groups).

The repositories 26a–26c are sequential data sets, which house the parameters specified by SQL Recall regarding what to cache, and where. These parameters include cache configurations, specifying the cache type, initial size, extension size, and number of extensions. The objects also include cursor definitions, which establish the caching rules, which qualify the cursors for which SQL Recall caches result tables or excludes result tables from cache. Qualification can be based on DB2 objects such as plans, databases, and table spaces. The objects also include management sets, which pair one or more cursor definitions with a cache configuration, enabling the use of a single command to put these multiple objects in active use.

A start-up data set 28 contains SQL activate commands to start SQL Recall automatically. An install defaults data set 30 contains parameters specified by the user when the user installed SQL Recall. These parameters are used by both the started task 12 and the ISPF interface/dialog 16. A cache 32 stores the SQL queries and results for each DB2. The user can name and define caches within the cache 32.

The started task 12 is responsible for the initiation, processing, and termination of many SQL Recall functions. The started task 12 is primarily event driven; it uses the MVS WAIT and POST services to drive most functions. The started task 12 defines all the caches, and loads the statistics capturing modules and the front ends to DB2. The started task 12 detects whether a DB2 subsystem or data sharing group is available. When a subsystem or data sharing group is unavailable, the started task 12 waits. When a subsystem or data sharing group becomes available, the started task activates pending management sets. The started task 12 validates and initiates commands to support automatic activation of management sets and subsequent modification of the active status. The started task 12 uses the MVS modify and stop command interface QEDIT to support use of these commands as console commands. Finally, the started task 12 records performance statistics in a log file, at a specified time interval.

The front ends 14 monitor DB2 query processing and update logging. When DB2 processes a query, SQL Recall determines whether to cache the result table and make it available for recall. When DB2 logs an update, SQL Recall determines whether to make a cached result table unavailable for recall.

The front ends 14 also accumulate performance statistics while caching result tables. Those statistics are: CPU time savings estimate; elapsed time savings estimates; number of result tables cached; number of result tables recalled; average number of recalls per cached result table; number of cached result tables removed because of update; number of cached result tables removed because of storage limit; average number of rows per cached result table; maximum number of rows per cached result table; and average result table creation time.

The ISPF interface/dialog 16 is Version 3.3 or later, is CUA compliant, and uses object-action sequences. The ISPF interface/dialog 16 1) monitors the SQL Recall active status, including performance statistics, and the latest-issued messages, 2) modifies the active status by activating or deactivating management sets or statistics logs, and 3) allows the user to browse, edit, and create the data objects of the repository 26.

The repository utility 18 facilitates maintenance of objects in multiple repository data sets. The repository utility 18 runs in a batch job, and performs the following tasks: 1) copies objects from one repository 26 to another; 2) deletes repository objects; 3) renames repository objects; and 4) lists all the data objects in the repositories 26.

The query analysis utility 20 captures query repetition on an active DB2 subsystem. The query analysis utility 22, running as a batch job, analyzes query repetition for a specified time interval, and reports potential savings that result from using SQL Recall. Specifically, the query analysis utility 22 reports the following: number of queries, CPU time usage, elapsed time usage, potential number of repetitive queries, potential CPU time savings by using SQL Recall, and potential elapsed time savings by using SQL Recall, and stores it in the query analysis data set 34.

In addition to the MVS operating system, the DB2 Version 2.3, and the ISPF Version 3.3 or later, already mentioned, SQL Recall also requires IBM's TSO/E Version 2 or later. SQL Recall automatically shrinks and expands the size of the caches it uses, based on its observance of the performance of the MVS operating system. More specifically, SQL Recall monitors the frequency of reference to determine which result tables are best saved or released, when the available cache is exhausted.

Figure 2:
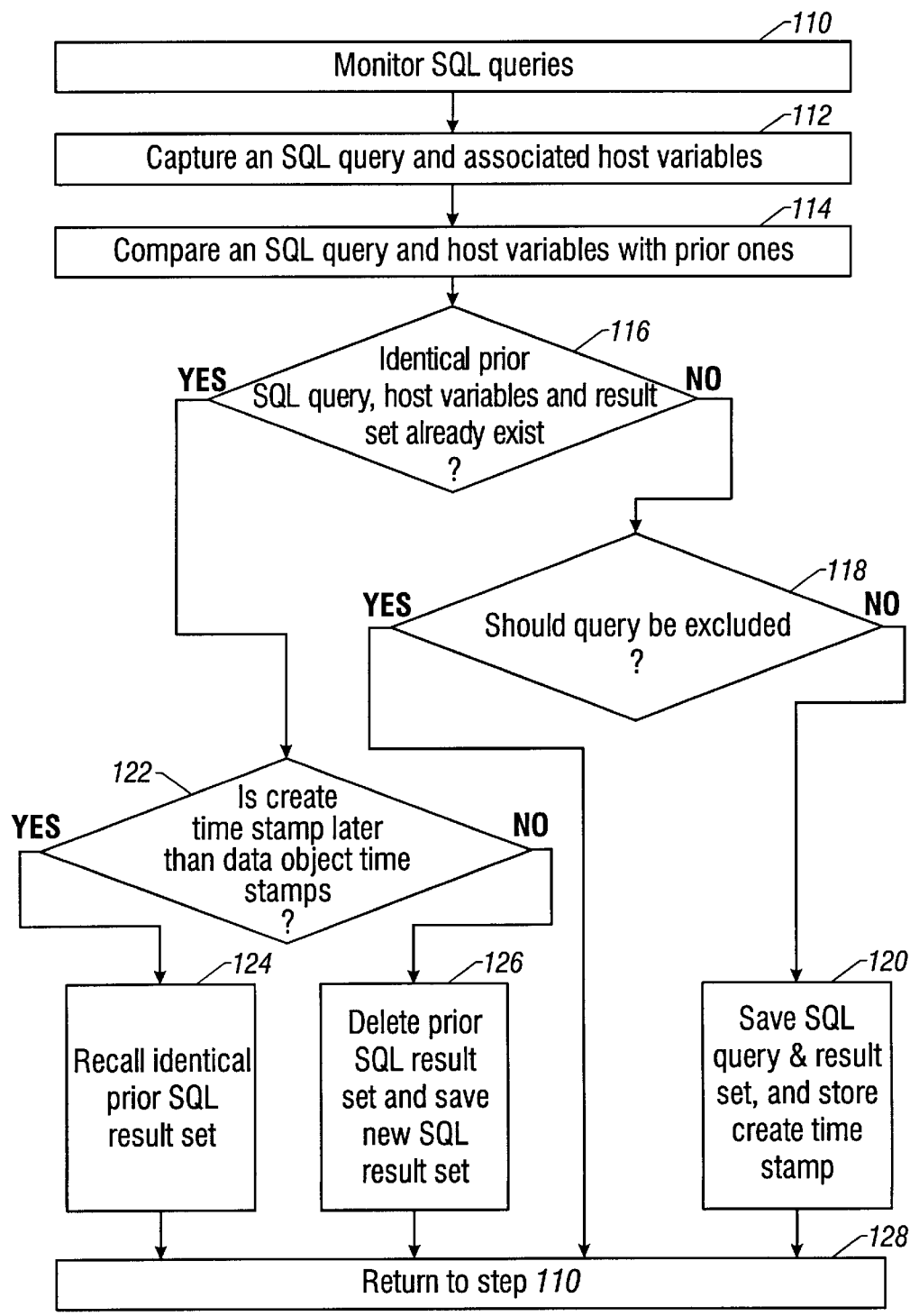
FIG. 2 is a flow chart of the analyzing of queries and result sets of the method of the present invention.

Referring to FIG. 2, in step 110 SQL Recall monitors all SQL queries. In step 112 SQL Recall captures an SQL query and the associated host variables. In step 114, SQL Recall compares the SQL query and host variables with prior saved SQL queries and host variables, to determine, in step 116, if an identical prior SQL query and corresponding result set already exist in cache. If an identical prior SQL query does not already exist, then in step 118 SQL Recall checks to see if the SQL query should be excluded from cache. SQL Recall excludes the following three types of queries: 1) SQL statements with a FOR UPDATE OF clause, a CURRENT keyword, or a USER keyword; 2) plans bound with repeatable read, read stability, or CURRENTDATA(YES); and 3) SQL OPEN CURSOR statements for which not all rows are fetched. A user may also choose to exclude any other SQL query. If the query is a query which should not be excluded from cache, then in step 120 SQL Recall saves the SQL query, host variables, and the corresponding result set.

To allow fast comparison of incoming SQL queries with saved queries, SQL Recall saves the SQL query, and associated host variables, in a look-up table, using a hash-sum technique, which converts the query and variables into a look-up key. Each key has twelve bytes: a four-byte field is used for the query, a four-byte field is used for the associated host variables, a two-byte field is used to represent the number of data objects used by the result set, and a two-byte field is used to represent the number of colums in the result set. Each four-byte field consists of a three-byte check sum, and a one-byte hash of the query or of the host variable.

Figures 3A, 3B, 4:
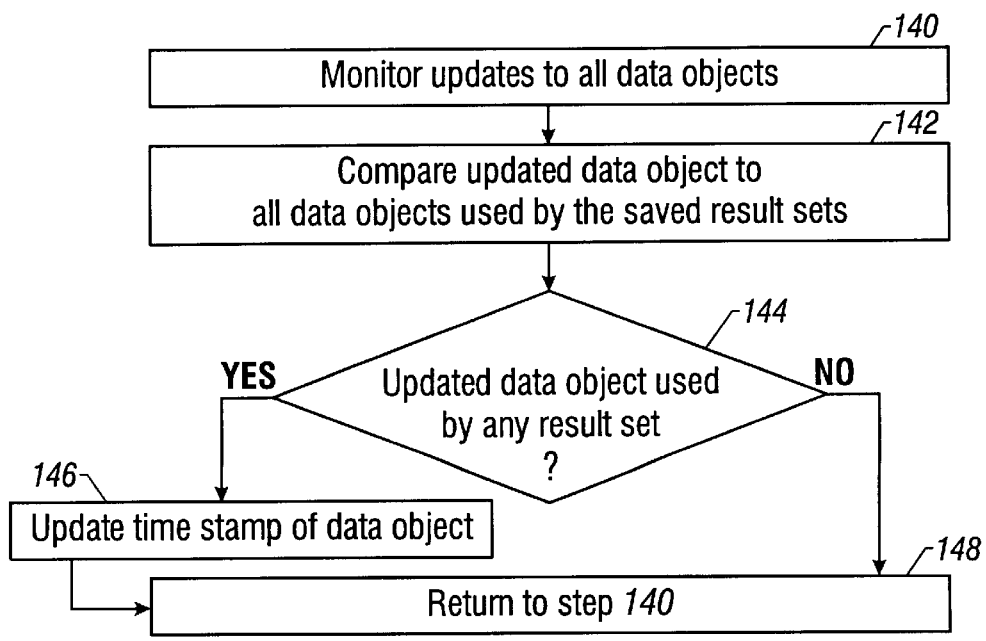
FIGS. 3a and 3b are tables showing the concatenation of an SQL query with associated host variables into keys, for use in a look-up table.
FIG. 4 is a flow chart of the monitoring of data objects of the method of the present invention.

FIG. 3a shows how two example host variables 150, 152 are concatenated. A hash-sum of an SQL query is created by concatenating a three-byte longitudinal "exclusive OR" checksum with a one-byte longitudinal hash of the SQL query. A hash-sum of the host variables associated with the SQL query is created by concatenating a three-byte longitudinal "exclusive OR" checksum of the associated host variables with a one-byte longitudinal hash of the associated host variables. If the application has no host variables, four-byte binary zeros are substituted for the host variables hash-sum. A twelve-byte key is then built by concatenating these two hash-sums 170, 172, with two two-byte integers, 174, 176, as shown in FIG. 3b.

If multiple SQL queries result in the same look-up key, then a collision has occurred. At least two types of collision can occur. First, collisons can occur during save, i.e., when the method attempts to save a query and host variables, and the resulting look-up key matches an existing key which maps into a different saved query and host variables. Another type of collision may occur during retrieval, when the method converts an incoming query and host variable to a look-up key, in order to determine whether an identical query has already been saved. That key could match an existing key that represents a different query and host variables. In other words, different queries and host variables could have the same look-up key.

When a collision occurs, the method simply does not recall a query or a result set. Rather, the method of the present invention allows the query to continue to the DB2 database system. Also, the method does not save the query result set, because another query result set already exists with the same look-up key.

Referring back to FIG. 2, in step 120 SQL Recall also stores a create time stamp. The create time stamp is the time at which the creation of the SQL result set occurred. Each data object used by the saved SQL result set has an associated data object time stamp, which contains the time of the last update to the data object.

Referring back to step 116, if in step 116 SQL Recall determines that an identical prior SQL result set already exists, then in step 122 SQL Recall compares the create time stamp of the identical prior SQL result set with the data object time stamps of all the data objects in the SQL result set. If no data object time stamp in the SQL result set is later than the create time stamp of the identical prior SQL result set, then in step 124 SQL Recall recalls the identical prior SQL result set. However, if a data object time stamp in the SQL result set is later than the create time stamp of the identical prior SQL result set, then in step 126 SQL Recall deletes the saved result set and then saves the new result set created by DB2. In step 128 SQL Recall returns to step 110 to monitor the SQL queries.

Referring now to FIG. 4, the monitoring of updates to data objects in the database is a separate process, independent of the monitoring of the SQL queries. In step 140, SQL Recall continually monitors all updates to all the data objects in the database. In step 142, SQL Recall compares an updated data object to all of the data objects used by the saved result sets. In step 144, SQL Recall determines if an updated data object is currently used by any saved result set. If it is, then in step 146 SQL Recall updates the data object time stamp, and then in step 148 returns to monitoring all data object updates. However, SQL Recall does not actually stop monitoring updates during steps 142, 144, and 146. Rather, the monitoring process is always active.

In an alternate embodiment, instead of storing a create time stamp, SQL Recall stores a capture time stamp, the capture time stamp being the time at which SQL Recall captured the SQL result set. Thus, in step 122, SQL Recall compares the capture time stamp of the identical prior SQL result set with the data object time stamps of all the data objects in the SQL result set. If no data object time stamp in the SQL result set is later than the capture time stamp of the identical prior SQL result set, then in step 124 SQL Recall recalls the identical prior SQL result set. However, if a data object time stamp in the SQL result set is later than the capture time stamp of the identical prior SQL result set, then in step 126 SQL Recall first deletes the saved result set, and then saves the new result set created by DB2.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A computer-readable medium encoded with a method of retrieving data from a relational database, using SQL queries, the SQL queries giving result sets comprising data objects, each data object having an associated data object time stamp, the method comprising the steps of:

a. monitoring the SQL queries and the data object time stamps of all data objects in the result sets;

b. capturing an SQL query and result set;

c. comparing the SQL query and host variables with prior saved SQL queries and host variables;

d. determining if an identical prior saved SQL query and associated host variables already exist;

e. if an identical prior SQL query and host variables do not already exist, then (i) saving the SQL query, together with its associated host variables and result set, and (ii) storing a create time stamp, the create time stamp being the time at which the step of creating the SQL result set occurred; and f. if an identical prior SQL result set already exists, then (i) comparing the create time stamp of the identical prior SQL result set with the data object time stamps of all the data objects used in the SQL result set, (ii) if no data object time stamp is later than the create time stamp of the identical prior SQL result set, then recalling the identical prior SQL result set, and (iii) if a data object time stamp is later than the create time stamp of the identical prior SQL result set, then first deleting the identical prior SQL result set, and then saving the SQL result set.

2. A computer-readable medium encoded with a method of retrieving data from a relational database, using SQL queries, the SQL queries giving result sets comprising data objects, each data object having an associated data object time stamp, the method comprising the steps of:

a. monitoring the SQL queries and the data object time stamps of all data objects in the result sets;

b. capturing an SQL query and result set; and c. comparing the SQL query and host variables with prior saved SQL queries and host variables;

d. determining if an identical prior SQL query and host variables already exist in cache;

e. if an identical prior SQL query and host variables do not already exist, then (i) saving the SQL query, together with its associated host variables and result set, and (ii) storing a capture time stamp, the capture time stamp being the time at which the step of capturing the SQL result set occurred; and f. if an identical prior SQL result set already exists, then (i) comparing the capture time stamp of the identical prior SQL result set with the data object time stamps of all the data objects in the SQL result set, (ii) if no data object time stamp in the SQL result set is later than the capture time stamp of the identical prior SQL result set, then recalling the identical prior SQL result set, and (iii)

if a data object time stamp in the SQL result set is later than the capture time stamp of the identical prior SQL result set, then first deleting the identical prior SQL result set, and then saving the SQL result set.

3. A computerized method of retrieving data from a relational database stored in a computer memory, the method using SQL queries, the SQL queries giving result sets derived from data objects, each data object having an associated data object time stamp, the method comprising the steps of:

a. monitoring the SQL queries and the data object time stamps of all data objects in the result sets;

b. creating an SQL query and result set;

c. comparing the SQL query with prior saved SQL queries;

d. if an identical prior SQL query does not already exist, then (i) saving the SQL query and result set, and (ii) storing a create time stamp, the create time stamp being the time at which the step of creating the SQL result set occurred;

e. if an identical prior SQL result set already exists, then (i) comparing the create time stamp of the identical prior SQL result set with the data object time stamps of all the data objects in the SQL result set, (ii) if no data object time stamp in the SQL result set is later than the create time stamp of the identical prior SQL result set, then recalling the identical prior SQL result set; and (iii) if a data object time stamp in the SQL result set is later than the create time stamp of the identical prior SQL result set, then first deleting the identical prior SQL result set, and then saving the SQL result set.

4. A computerized method of retrieving data from a relational database stored in a computer memory, the method using SQL queries, the SQL queries giving result sets derived from data objects, each data object having an associated data object time stamp, the method comprising the steps of:

a. monitoring the SQL queries and the data object time stamps of all data objects in the result sets;

b. capturing an SQL query and result set;

c. comparing the SQL query with prior saved SQL queries;

d. if an identical prior SQL query does not already exist, then (i) saving the SQL query and result set, and (ii) storing a capture time stamp, the capture time stamp being the time at which the step of capturing the SQL result set occurred;

f. if an identical prior SQL result set already exists, then (i) comparing the capture time stamp of the identical prior SQL result set with the data object time stamps of all the data objects in the SQL result set, (ii) if no data object time stamp in the SQL result set is later than the capture time stamp of the identical prior SQL result set, then recalling the identical prior SQL result set; and (iii) if a data object time stamp in the SQL result set is later than the capture time stamp of the identical prior SQL result set, then first deleting the identical prior SQL result set, and then saving the SQL result set.

\* \* \* \* \*